(12) United States Patent
Kurth et al.

(10) Patent No.: US 8,651,496 B2
(45) Date of Patent: Feb. 18, 2014

(54) SEAL

(75) Inventors: Jürgen Kurth, Odenthal (DE); Clifford Roland Worsley, Langenfeld (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 12/745,154

(22) PCT Filed: Nov. 28, 2007

(86) PCT No.: PCT/EP2007/010307
§ 371 (c)(1),
(2), (4) Date: Oct. 25, 2010

(87) PCT Pub. No.: WO2009/068050
PCT Pub. Date: Jun. 4, 2009

(65) Prior Publication Data
US 2011/0031701 A1 Feb. 10, 2011

(51) Int. Cl.
*F16J 15/32* (2006.01)

(52) U.S. Cl.
USPC .............................. 277/549; 277/559; 277/572

(58) Field of Classification Search
USPC ......... 277/549, 552, 553, 555, 558, 559, 561, 277/568, 571, 572, 573, 926
See application file for complete search history.

(56) References Cited

U.S. PATENT DOCUMENTS

| 2,896,979 | A | * | 7/1959 | Stephens | 277/380 |
|---|---|---|---|---|---|
| 3,554,561 | A | * | 1/1971 | Weinand | 277/559 |
| 3,920,250 | A | * | 11/1975 | Eklund | 277/555 |
| 4,194,745 | A | | 3/1980 | McDougal | |
| 4,300,777 | A | * | 11/1981 | Symons | 277/559 |
| 4,334,687 | A | * | 6/1982 | Holzer et al. | 277/430 |
| 4,421,321 | A | * | 12/1983 | Lipschitz | 277/424 |
| 4,553,760 | A | | 11/1985 | Reed | |
| 4,844,484 | A | * | 7/1989 | Antonini et al. | 277/561 |
| 5,082,294 | A | * | 1/1992 | Toth et al. | 277/551 |
| 5,137,285 | A | | 8/1992 | Pick | |
| 5,456,475 | A | * | 10/1995 | Abraham et al. | 210/171 |
| 6,334,619 | B1 | * | 1/2002 | Dietle et al. | 277/559 |
| 7,172,201 | B2 | * | 2/2007 | Uhrner | 277/559 |
| 7,419,165 | B2 | * | 9/2008 | Toth et al. | 277/569 |
| 7,770,897 | B2 | * | 8/2010 | Berdichevsky | 277/551 |
| 7,832,100 | B2 | * | 11/2010 | Toth et al. | 29/888.3 |
| 7,946,592 | B2 | * | 5/2011 | Yamamoto et al. | 277/572 |
| 2005/0098959 | A1 | * | 5/2005 | Uhrner | 277/500 |
| 2006/0038354 | A1 | | 2/2006 | Toth | |
| 2008/0122181 | A1 | * | 5/2008 | Grimanis | 277/308 |
| 2010/0187768 | A1 | * | 7/2010 | Sedlar et al. | 277/561 |

FOREIGN PATENT DOCUMENTS

| EP | 0213652 A1 | 3/1987 |
|---|---|---|
| GB | 2417993 A | 3/2006 |

* cited by examiner

*Primary Examiner* — Gilbert Lee
(74) *Attorney, Agent, or Firm* — Bryan Peckjian; SKF USA Inc. Patent Department

(57) ABSTRACT

A seal to seal a gap between a rotatable component (4, 18) and a non-rotatable component comprises: A fastening section adapted to be fixedly mounted in relation to the non-rotatable component, a sleeve-like section (3) adapted to be mounted around the rotatable component (4, 18), a resilient section (7) between the sleeve-like and fastening section comprising an arcuate portion (8), and in an unmounted condition, the sleeve-like section (3) has an inner diameter, $D_{SEAL}$, with a predefined magnitude relative to an outer diameter of the rotating component, $D_{SHAFT}$, such that $0.9 \leq D_{SEAL}/D_{SHAFT} \leq 1.1$.

24 Claims, 5 Drawing Sheets

SEAL

BACKGROUND OF THE INVENTION

The present invention concerns a seal for sealing a gap between relatively rotatable components.

Seal assemblies are widely applied to seal a gap between relatively rotatable components; for example, the gap between a revolving shaft or axle and the housing bore of a motor. The seals serve to retain lubricant within the motor and to exclude the entry of contaminants. Both of these aspects are important for proper running of the motor and the prevention of early failure. A typical seal comprises an outer casing to which a sealing element is bonded. Elastomeric materials, such as nitrile rubber, may be used for the sealing element. The outer casing seals statically against the housing bore. The sealing element seals against a counterface of the e.g. shaft and provides dynamic sealing during rotational conditions and static sealing during stationary conditions.

Seals that are designed to retain oil or a low-viscosity fluid are generally spring loaded, to ensure static and dynamic tightness. In other words, the sealing element has a certain preload to keep it pressed against the rotating component and this leads to additional friction and heat generation at the seal interface.

Another factor which must be taken into account with regard to seals is misalignment. This can be shaft-to-bore misalignment, which is the amount by which the shaft is off centre with respect to the centre of the housing bore; dynamic runout, which is a measure of the amount by which the shaft does not rotate around its true centre; or a combination of both. Due to manufacturing and assembly inaccuracies, some misalignment and runout is always present and seals are generally designed to accommodate these eccentricities up to predefined maximum values. In applications where significant misalignments must be accommodated, a high spring preload in a lip seal is advantageous. In a crankshaft sealing application, for example, random shaft defections caused by piston slap may occur, and a high preload helps ensure that the sealing element remains in contact with the shaft, despite the rotational eccentricities. The higher preload, however, increases the friction, which leads to a higher energy consumption and greater energy losses.

SUMMARY OF THE INVENTION

Thus, it is an object of the invention to provide an improved seal which may be mounted to seal a gap between two relatively rotatable components.

According to a first embodiment of the present invention a seal to seal a gap between a rotatable component and a non-rotatable component comprises:

A fastening section adapted to be fixedly mounted in relation to the non-rotatable component, a sleeve-like section adapted to be mounted around the rotatable component, a resilient section between the sleeve-like and fastening section comprising an arcuate portion, and in an unmounted condition, the sleeve-like section has an inner diameter, $D_{SEAL}$, with a predefined magnitude relative to an outer diameter of the rotating component, $D_{SHAFT}$, such that $0.9 \leq D_{SEAL}/D_{SHAFT} \leq 1.1$.

The sleeve-like section may be made of a stiff material so that in the unmounted condition, it retains its sleeve-like shape and remains substantially parallel to an axial centerline of the seal. A stiff sleeve is advantageous, as it enables optimal positioning of the sleeve relative to the component to be sealed, while the precise relative dimensioning allows optimal sealing performance. During rotational conditions, any rotational eccentricities are accommodated by the resilient section, which acts like a hinge. It does not exert a preloaded force on the sleeve-like section, and friction is therefore minimized. The resilient section must be able to withstand the friction torque generated at the sealing interface, as well as potential pressure differentials between an axially inner and axially outer side of the seal. If the sleeve-like section is mounted with a slight interference fit, the torque at start-up may be relatively high.

Thus according to a further aspect of the invention, the seal may be provided with stiffening means, such as a plurality of ribs or grooves extending radially from a first connection point on the sleeve-like section to a second connection point on the resilient section.

The sleeve-like section may be made from a variety of materials including, but not restricted to, plastics such as Polytetrafluoroethylene (PTFE) and Polyurethane; metals such as bronze or sinter metal; or rubbers such as Nitrile Acrylonitrile Butadiene (NBR) or a combination of these materials. When made of rubber, the sleeve-like section and the resilient section may be made from the same material, where the two sections are integrally formed as a single piece.

When executed in rubber or plastic, the inner diameter of the sleeve-like section relative to the outer diameter of the rotatable component may be selected to have a value smaller than one in the specified range. The advantage of a slight interference fit is that the sleeve-like section provides static sealing. When executed in metal, the inner diameter of the sleeve-like section relative the outer diameter of the rotatable component is preferably selected to have a value bigger than one in the specified range, so that it may be mounted with a slight clearance fit. A metal sleeve-like section has the advantage of greater wear resistance, thermal resistance and chemical resistance.

According to a further aspect of the invention, the material of the sleeve-like section is selected with reference to its coefficient of thermal expansion, $\alpha_{SLEEVE}$, and with reference to the coefficient of thermal expansion of the material of the rotatable component. During operation, the seal temperature will rise due to frictional torque or due to heat transfer from the rotatable component to the sleeve-like section, meaning that the sleeve-like section will experience thermal expansion. Typically, the rotatable component will be a steel shaft, with a coefficient of thermal expansion, $\alpha_{SHAFT}$, of approximately $1 \cdot 10^{-6}$ K$^{-1}$. The material of the sleeve-like section is then suitably selected with reference to a given difference in diameter, $D_{SLEEVE} - D_{SHAFT}$, such that at a minimum expected rise in temperature, the inner diameter of the sleeve-like section increases due to thermal expansion by an amount that is at least equal to an increase in the outer diameter of the rotatable component due to thermal expansion plus a predefined amount, X, where $X = 2g - (D_{SEAL} - D_{SHAFT})$, and where g is a predefined desirable gap between the inner diameter $D_{SEAL}$ and outer diameter $D_{SHAFT}$ during operation.

In practice, this means that the material of the sleeve-like section has a higher coefficient of thermal expansion than the shaft material. The coefficient of thermal expansion of rubbers, for example, lies in the range of 16 to $22 \cdot 10^{-6}$ K$^{-1}$. If the sleeve-like section is mounted with a slight interference fit, the greater thermal expansion of the sleeve-like section relative to the thermal expansion of the rotatable component will ensure low-friction conditions during operation.

According to a further aspect of the invention, sealing performance may be enhanced by providing the sealing surface of the sleeve-like portion with hydrodynamic means.

These may take the form of one or more sets of helical protrusions (for example ribs) or helical recesses (for example a spiral thread). The helical protrusions or recesses may be unidirectional, meaning that the helices are oriented with respect to the rotational direction of the rotatable component such that during rotation, a pumping action is realized which pumps the fluid to be retained towards the fluid-side of the seal. If the rotatable component is bidirectional, the sealing surface of the sleeve-like section may be provided with bidirectional helical recesses or helical protrusions, to enable pumping of the fluid in the desired direction, regardless of the rotational direction of the e.g. shaft.

The helical protrusions or recesses may form a continuous helix along the entire length the sealing surface. If the sleeve-like section is mounted with a slight interference fit, the helix could provide a path via which fluid might escape during static conditions. In the case of an interference fit, the helical protrusions or recesses are preferably provided on only a portion of the sealing surface or, the helix should be interrupted, so that the sleeve-like section has a solid annular surface in contact with the counterface of the rotatable component. The solid annular surface then acts as barrier for any fluid during static conditions. In the case of a clearance fit of the sleeve-like section, the seal is preferably provided with at least one flexible lip. The at least one flexible lip is then adapted to seal against the counterface of the rotatable component at the fluid side of the sleeve-like section and/or at the 'air' side of the sleeve-like section. The flexible lip may be suitably angled such that the lip opens due to the pumping action of the hydrodynamic means on the sleeve-like section, but closes when there is no rotation, thereby serving as a static seal.

In addition to the sealing surface, one or both end faces of the sleeve-like section may be provided with hydrodynamic means. For example, an end face could be provided with a sinusoidal surface geometry or with ramps in the form of a saw-tooth pattern, to direct the fluid to the fluid side of the seal. At the fluid side, the end face could also be executed with a lead-in chamfer, to facilitate mounting of the inventive seal.

Hydrodynamic means to improve sealing performance may also be provided on the seal counterface, i.e. on the outer diameter of the rotatable component. As will be clear to persons skilled in the art, the seal counterface may also be formed by a radially outer surface of a wear sleeve. Wear sleeves are often used if the surface of the rotatable component does not possess the required quality or is damaged. One or more sets of helical recesses or helical protrusions can be provided on the seal counterface and, as described for the sealing surface of the sleeve-like section, the helices may be unidirectional or bidirectional and continuous or non-continuous. In one embodiment of a seal according to the invention, the wear sleeve is an integral component of the seal, which is then mounted as a unit around the rotatable component. The wear sleeve is mounted with a press fit, so that it rotates with the e.g. shaft.

When the inventive seal is executed as a unit, the wear sleeve will generally comprise a flinger component, which acts as a barrier to contaminants and, during rotational conditions, dynamically repels contaminants. A seal according to the invention may also be provided with other means to exclude contaminants. For example, the resilient section may further comprise a non-contacting dust lip at an axially outer side of the sleeve-like section. The seal could also be provided with a dust cover.

A seal according to the invention comprises a stiff, sleeve-like sealing element which, in mounted condition, has extremely little play relative to the rotatable component. This minimizes friction during rotational conditions. The inventive seal also provides excellent dynamic and static sealing performance. Other advantages of the invention will become apparent from the detailed description and accompanying figures.

BRIEF DESCRIPTION OF THE SEVERAL VIEWS OF THE DRAWINGS

The invention will now be described in more detail for explanatory, and in no sense limiting, purposes, with reference to the following figures, in which.

DETAILED DESCRIPTION OF THE INVENTION

Figure 1A:
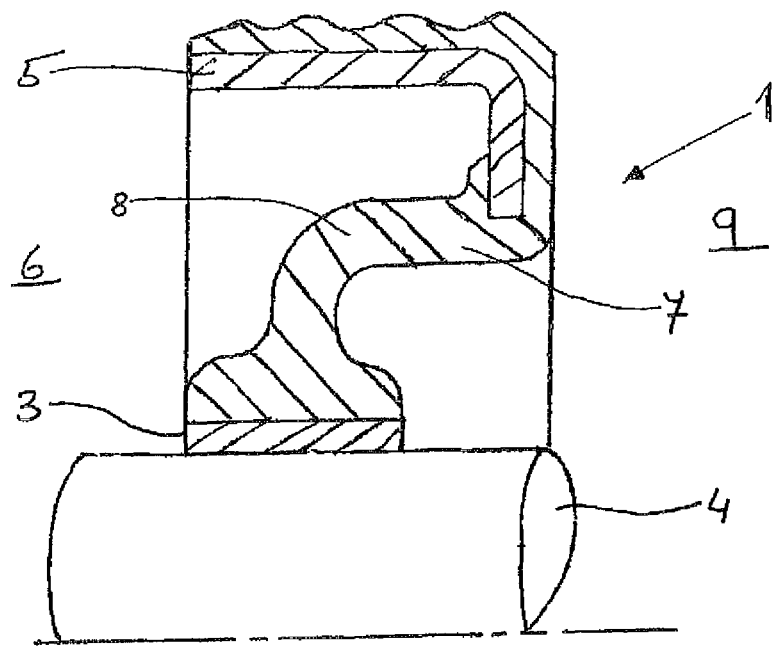
FIG. 1a-1b illustrate a partial radial view of embodiments of a seal according to the invention.

An example of a seal according to the invention is shown in FIG. 1a. The seal 1 comprises a sleeve-like section 3, which is adapted to be mounted around a rotatable component such as a shaft 4. The sleeve-like section 3 is connected to an outer casing 5 of the seal by means of a resilient section 7. The outer casing 5 is adapted to be mounted in e.g. a bore of a housing, and may (as shown) consist of a metal flange with a rubber outside diameter. Other variations are possible, such as a full rubber or a full metal casing. The outer casing 5 seals statically against the housing bore (not shown) and the sleeve-like section 3 provides dynamic sealing during rotation of the shaft 4. Such a seal may be used to seal a gap between a rotatable and a non-rotatable component and thereby retain fluid at a fluid side 6 of the seal in relation to an airside 9 of the seal.

According to the invention, low-friction dynamic sealing is obtained in that the sleeve-like section 3 is precisely dimensioned in relation to the shaft 4 it is adapted to be mounted around. Specifically, the sleeve-like section 3 has an inner diameter, $D_{SLEEVE}$, which is selected with reference to an outer diameter of the shaft, $D_{SHAFT}$, such that in an unmounted condition $0.9 \leq D_{SEAL}/D_{SHAFT} \leq 1.1$. Thus, a value smaller than one in the specified range leads to a slight interference fit when the sleeve-like section 3 is mounted around the shaft 4, and a value bigger than one leads to a slight clearance fit.

The sleeve-like section 3 may be made of a stiff material so that in the unmounted condition, it retains its sleeve-like shape and remains substantially parallel to an axial centerline of the seal. A stiff sleeve enables optimal positioning of the sleeve relative to the shaft to be sealed, while the precise relative dimensioning allows optimal sealing performance. In order to accommodate any rotational eccentricities between the shaft 4 and the housing bore, the resilient section 7 of the seal further comprises an arcuate portion 8. This arcuate portion 8 acts like a hinge, and does not exert a preloaded force on the sleeve-like section 3. As a result, the friction torque generated is substantially lower compared with conventional seal designs.

Figure 1B:
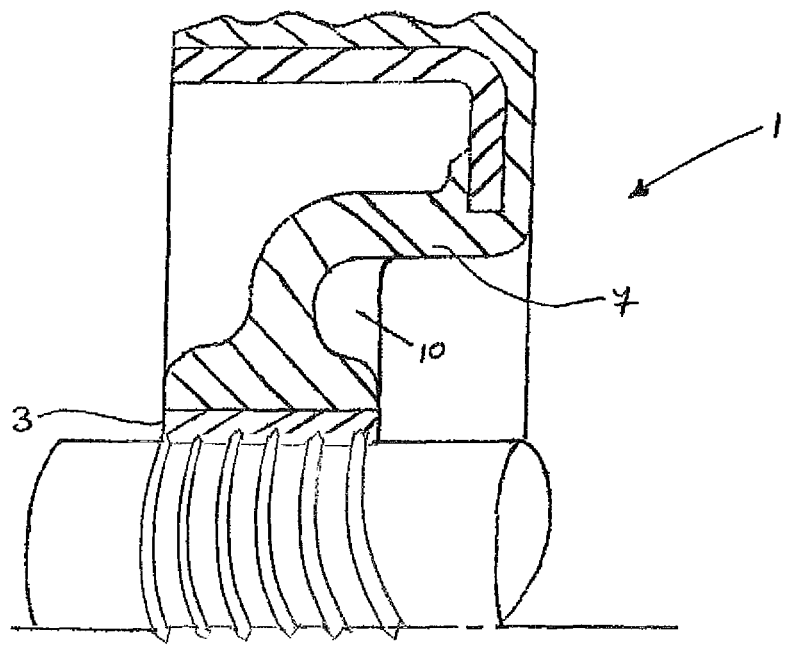

The resilient section 7 must be able to withstand the friction torque that is generated at the sealing interface, as well as potential pressure differentials between the fluid side 6 and the airside 9 of the seal 1. Moreover, if the sleeve-like section 3 is mounted with a slight interference fit, the torque at startup may be relatively high. Therefore, in an advantageous further development of the invention, the seal may be provided with stiffening means. An example of this is shown in FIG. 1b, in which the seal 1 further comprises a plurality of stiffening ribs 10, which extend radially from a first connection point on the sleeve-like section 3 to a second connection point on the resilient section 7.

According to a further aspect of the invention, the material of the sleeve-like section 3 is selected with reference to its coefficient of thermal expansion, $\alpha_{SLEEVE}$, in relation to the coefficient of thermal expansion of the shaft material. During operation, the seal temperature will rise due to frictional torque or due to heat transfer from the shaft 4 to the sleeve-like section 3, meaning that the sleeve-like section will experience thermal expansion. Typically, the shaft will be a steel shaft, with a coefficient of thermal expansion, $\alpha_{SHAFT}$) of approximately $10 \cdot 10^{-6}$ K$^{-1}$. The material of the sleeve-like section 3 is then suitably selected with reference to a given difference in diameter, $D_{SLEEVE} - D_{SHAFT}$, such that at a minimum expected rise in temperature, the inner diameter of the sleeve-like section increases due to thermal expansion by an amount that is at least equal to an increase in the outer diameter of the shaft to thermal expansion plus a predefined amount, X, where $X = 2g - (D_{SEAL} - D_{SHAFT})$, and where g is a predefined desirable gap between the inner diameter $D_{SLEEVE}$ and outer diameter $D_{SHAFT}$ during operation.

In practice, this means that the material of the sleeve-like section has a higher coefficient of thermal expansion than the shaft material. The sleeve-like section 3 may be made of a rubber material such as NBR, or a plastic material such as PTFE, or a metal such as bronze. The coefficient of thermal expansion of rubbers, for example, lies in the range of 16 to $22 \cdot 10^{-6}$ K$^{-1}$. If the sleeve-like section 3 is mounted with a slight interference fit, the greater thermal expansion of a rubber sleeve-like section relative to the thermal expansion of a steel shaft will ensure low-friction conditions during operation.

Figure 2A:
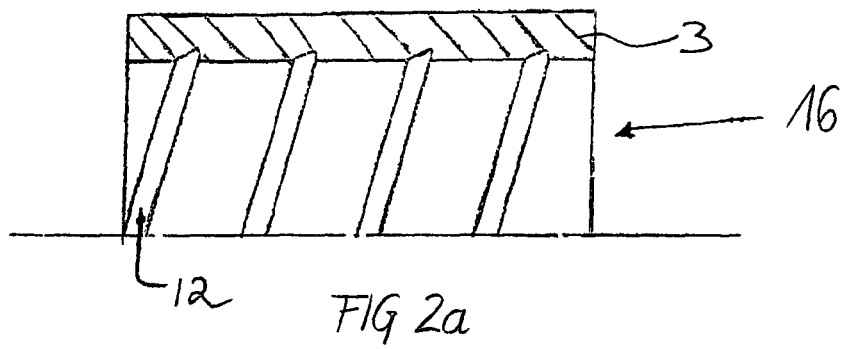
FIGS. 2a-2b illustrate examples of hydrodynamic means on sealing surface of sleeve-like section.
Figure 2B:
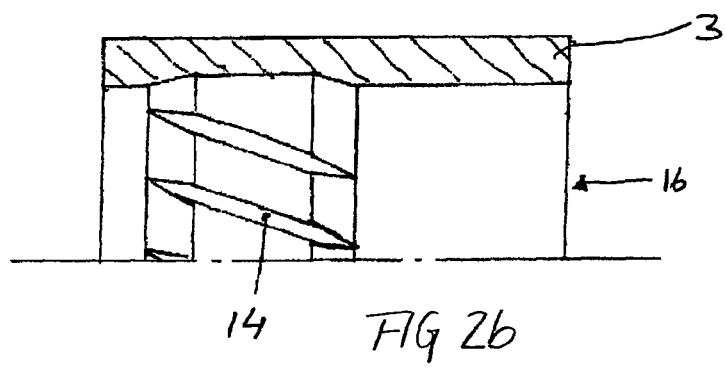

During operation, sealing performance may be further enhanced by providing the sealing surface of the sleeve-like section with hydrodynamic means. Examples of suitable hydrodynamic means are shown in FIG. 2a and FIG. 2b. These may take the form of one or more sets of helical protrusions (a spiral thread), as shown in FIG. 2a, or helical recesses (ribs), as shown in FIG. 2B. The helical protrusions 12 or helical recesses 14 may be unidirectional, meaning that the helices are oriented with respect to the rotational direction of the shaft such that during rotation, a pumping action is realized which pumps the fluid to be retained towards the fluid-side of the seal. If the shaft is bidirectional, the sealing surface 16 of the sleeve-like section may be provided with bidirectional helical recesses or helical protrusions, to enable pumping of the fluid in the desired direction, regardless of the rotational direction of the shaft.

The helical protrusions 12 or recesses 14 may form a continuous helix along the entire length the sealing surface 16. If the sleeve-like section 3 is mounted with a slight interference fit, the helix could provide a path via which fluid might escape during static conditions. In the case of an interference fit, the helical protrusions 12 or recesses 14 are preferably provided on only a portion of the sealing surface 16 or, the helix should be interrupted, so that the sleeve-like section 3 has a solid annular surface in contact with the shaft. The solid annular surface then acts as barrier for any fluid during static conditions.

Figure 3:
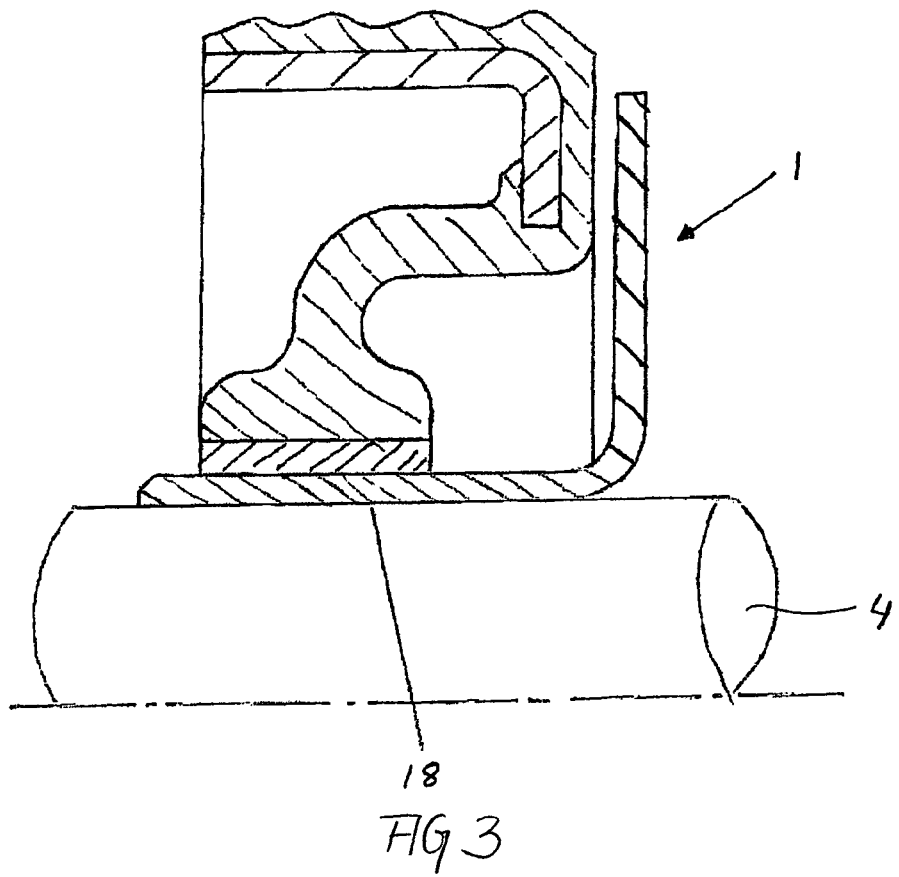
FIG. 3 illustrates a seal according to the invention executed as a unit.

Hydrodynamic means to improve sealing performance may also be provided on the seal counterface, i.e. on the outer diameter of the rotating component. Thus, one or more sets of helical protrusions 12 or helical recesses 14 can be provided on the seal counterface and, as described for the sealing surface 16 of the sleeve-like section 3, the helices may be unidirectional or bidirectional and continuous or non-continuous. As will be clear to persons skilled in the art, the seal counterface may also be formed by a wear sleeve component press-fitted onto the shaft. In one embodiment of a seal according to the invention, as shown in FIG. 3, the wear sleeve 18 is an integral component of the seal 1, which is then mounted as a unit around the shaft 4.

Figure 4:
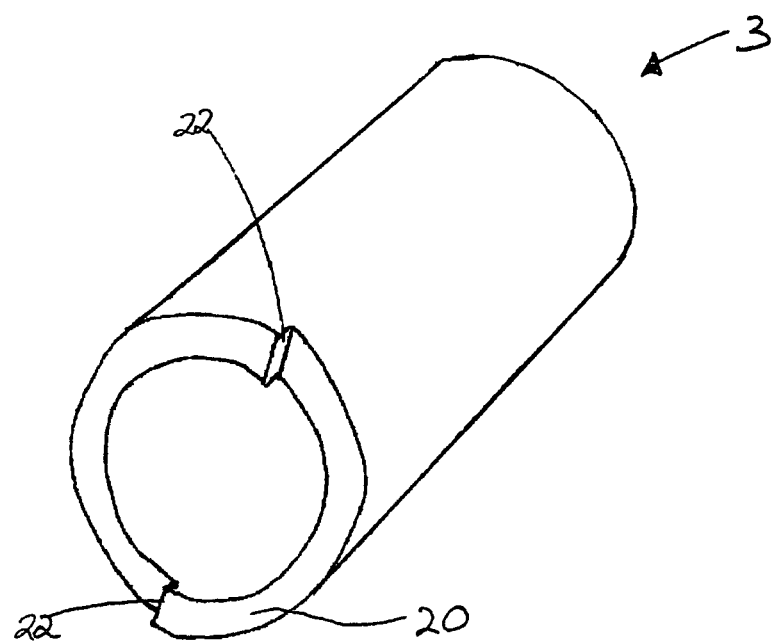
FIG. 4 illustrates an example of hydrodynamic means on an end face of the sleeve-like section.

In a further advantageous development of the invention, one or both end faces of the sleeve-like section may be provided with hydrodynamic means. FIG. 4 shows a perspective view of a sleeve-like section 3 provided with one example of hydrodynamic means on an end face. Here, the end face 20 has been provided with ramps 22 in its surface. The ramps may have various geometries, e.g. a straight or rounded sawtooth pattern. One or both of the end-faces 20 could also be provided with a sinusoidal surface geometry, or some other varying surface geometry. The hydrodynamic means may be adapted such that during rotational conditions, fluid is directed towards the fluid side of the seal. Alternatively, at the airside of the sleeve-like section 3, hydrodynamic means on the end face could be adapted to direct contaminants away from the seal.

Figure 5A:
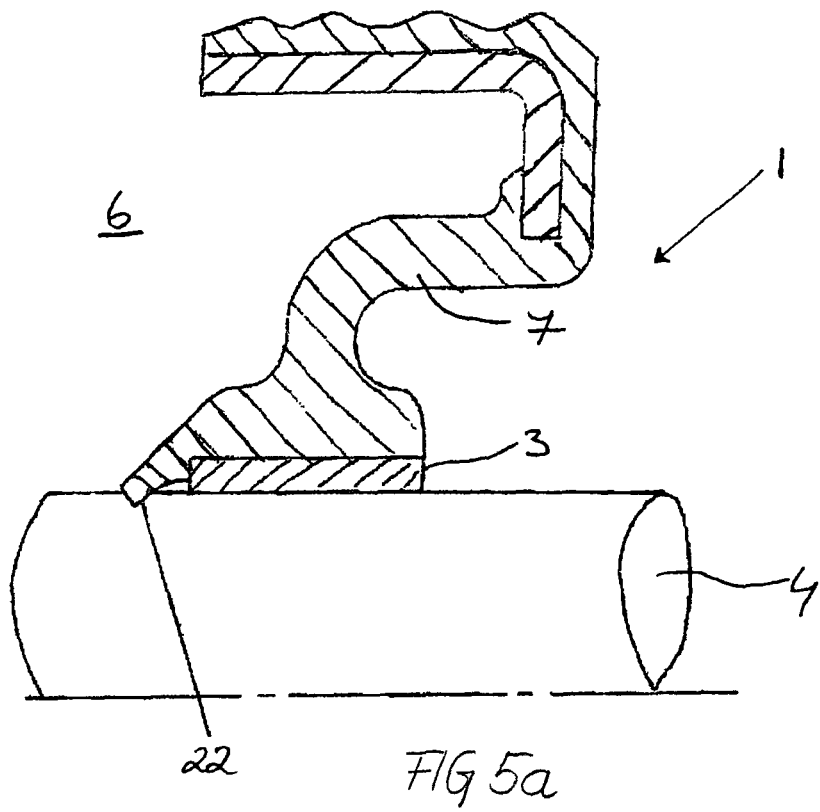
FIGS. 5a-5d illustrate further embodiments of a seal according to the invention.
Figure 5B:
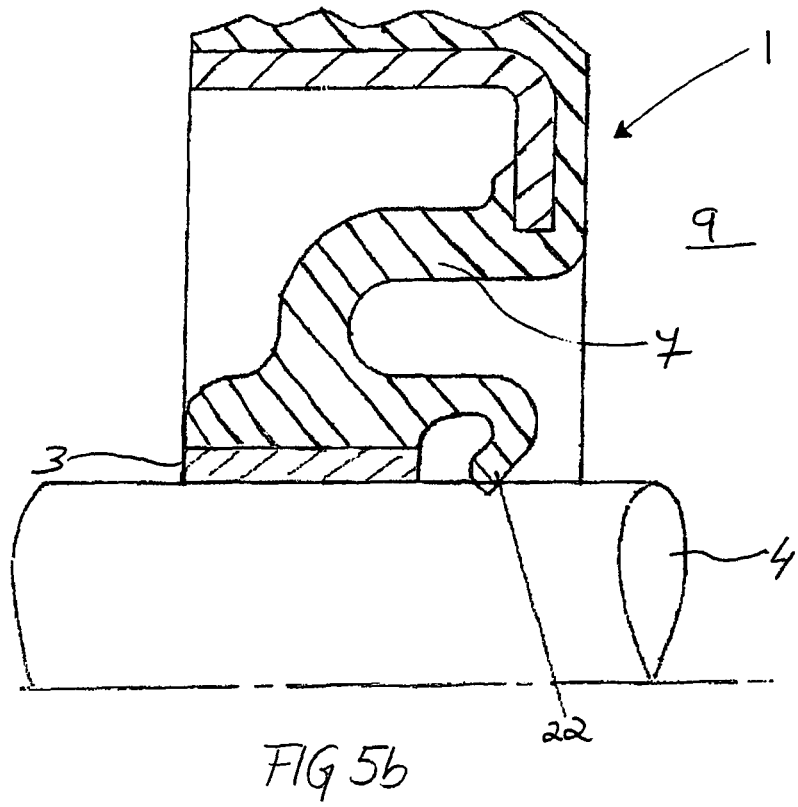

According to the invention, the sleeve-like section may be mounted with a slight interference fit or a slight clearance fit. In order to provide static sealing in the case of a clearance fit of the sleeve-like section, the seal is preferably provided with at least a first flexible sealing lip. Such an embodiment of the invention is shown in FIG. 5a, where the resilient section 7 of the seal 1 comprises a flexible sealing lip 22, which seals against the shaft 4 at the fluid side 6 of the sleeve-like section 3. The seal may also be provided with a second flexible sealing lip, as shown in FIG. 5b. Here, the resilient section 7 of the seal 1 comprises a flexible sealing lip 22, which seals against the shaft 4 at the airside 9 of the sleeve-like section 3. The first and/or second flexible sealing lip 22 may be suitably angled such that the lip opens due to the pumping action of the hydrodynamic means on the sleeve-like section 3, but closes when there is no rotation, thereby serving as a static seal.

Figure 5C:
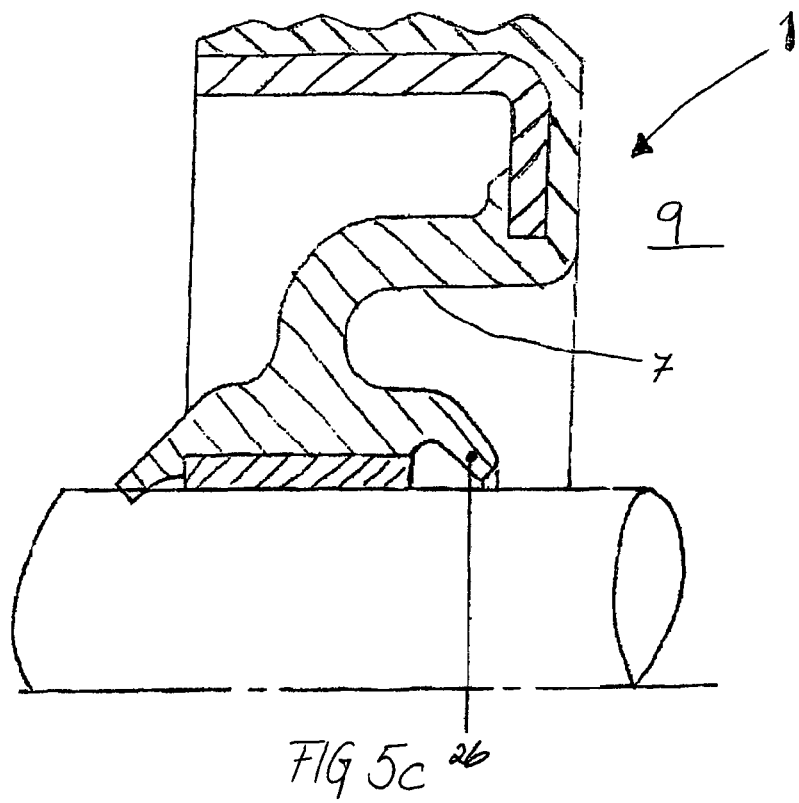
Figure 5D:
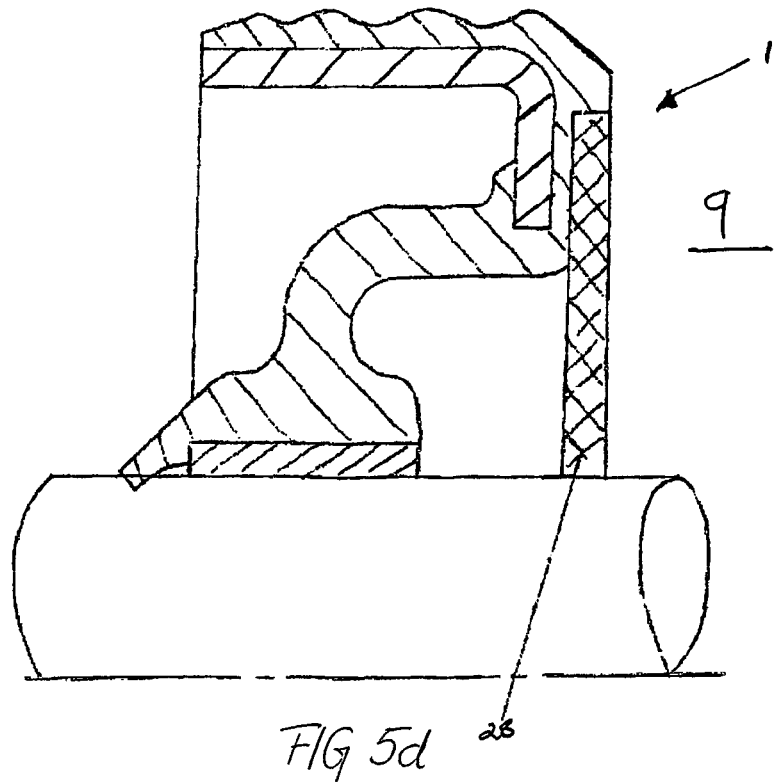

A seal according to the invention may also be provided with means to enhance contamination exclusion. As shown in FIG. 5c, the resilient section 7 of the seal 1 may comprise a non-contacting dust lip 26 at the airside 9 of the sleeve-like section 3. In a further embodiment, as shown in FIG. 5d, a dust cover 28 may be bonded to the resilient section 7 at the airside 9 of the seal 1.

A number of aspects/embodiments of the invention have been described. It is to be understood that each aspect/embodiment may be combined with any other aspect/embodiment. Moreover the invention is not restricted to the described embodiments, but may be varied within the scope of the accompanying patent claims.

| Reference Numerals | |
|---|---|
| 1 | Seal |
| 3 | Sleeve-like section |
| 4 | Shaft |
| 5 | Outer casing |
| 6 | Fluid side of seal |

-continued

| Reference Numerals | |
|---|---|
| 7 | Resilient section |
| 8 | Arcuate portion |
| 9 | Air side of seal |
| 10 | Stiffening ribs |
| 12 | Helical protrusions |
| 14 | Helical recesses |
| 16 | Sealing surface of sleeve-like section |
| 18 | Wear sleeve |
| 20 | End face of sleeve-like section |
| 22 | Flexible sealing lip |
| 26 | Dust lip |
| 28 | Dust cover |

The invention claimed is:

1. A seal to seal a gap between a rotatable component and a non-rotatable component, the rotatable component having an outer diameter, the seal comprising:
    a fastening section adapted to be fixedly mounted in relation to the non-rotatable component,
    a sleeve executed in metal and adapted to be mounted around the rotatable component such that the rotatable component is rotatable relative to the sleeve, the sleeve having an inner diameter defining a sealing surface, wherein the sealing surface forms a dynamic seal with the outer diameter of the rotatable component when the rotatable component is rotated,
    a resilient section disposed between the sleeve and the fastening section and including an arcuate portion, and
    wherein a ratio of the inner diameter of the sleeve in an unmounted state to the outer diameter of the rotatable component is greater than 1 such that a clearance fit is defined between the inner diameter of the sleeve and the outer diameter of the rotatable component, at least when the rotatable component is stationary.

2. The seal according to claim 1, wherein in the unmounted state, the sleeve is substantially parallel to an axial centerline of the seal.

3. The seal according to claim 1, wherein the fastening section includes stiffening means.

4. The seal according to claim 1, wherein the sleeve is formed of a material selected so as to have a coefficient of thermal expansion in relation to a coefficient of thermal expansion of the rotatable component such that at a minimum expected temperature increase during relative rotation between the sleeve and the rotatable component, a difference between an increase in the inner diameter of the sleeve due to thermal expansion and an increase in the outer diameter of the rotatable component due to thermal expansion is at least a predefined amount X where:
    X=2g−(sleeve inner diameter−rotatable shaft outer diameter); and
    g=a predefined desired gap between the sleeve inner diameter and the rotatable shaft outer diameter during relative rotation.

5. The seal according to claim 1, wherein the sleeve and the resilient section are integrally formed as a single piece.

6. The seal according to claim 1, wherein the sealing surface of the sleeve comprises hydrodynamic means.

7. The seal according to claim 6, wherein the hydrodynamic means comprises at least one set of helical protrusions in the sealing surface, or at least one set of helical recesses in the sealing surface, or both.

8. The seal according to claim 7, wherein at least one helical protrusion of the at least one set of the helical protrusions and at least one helical recess of the at least one set of helical recesses are one of unidirectional and bidirectional.

9. The seal according to claim 7, wherein the at least one helical protrusion and the at least one helical recess form one of a continuous helix and a non-continuous helix.

10. The seal according to claim 6, further comprising a flexible sealing lip disposed at an axial end of the sleeve and configured to seal with the rotatable component when the rotatable component is stationary, wherein the flexible sealing lip is further configured to communicate with the hydrodynamic means, such that relative rotation between the rotatable component and the sleeve causes the hydrodynamic means to urge fluid toward the flexible sealing lip, causing the flexible sealing lip to lift away from the outer diameter of the rotatable component.

11. The seal according to claim 1, wherein the seal has a mounting side and the sleeve has a lead-in chamfer edge at the seal mounting side.

12. The seal according to claim 1, wherein the seal further comprises at least one flexible sealing lip adapted to seal against the rotatable component at one of an axially outer side in relation to the sleeve and an axially inner side in relation to the sleeve.

13. The seal according to claim 1, wherein the outer diameter of the rotatable component comprises hydrodynamic means.

14. The seal according to claim 1, wherein the outer diameter of the rotatable component is formed by a radially outer surface of a wear sleeve component.

15. The seal according to claim 14, wherein the wear sleeve component is an integral part of the seal.

16. The seal according to claim 1, wherein the seal further comprises a non-contacting dust lip.

17. The seal according to claim 1, wherein the seal further comprises a dust cover.

18. The seal according to claim 1, wherein the ratio of the inner diameter of the sleeve in an unmounted state to the outer diameter of the rotatable component is less than about 1.05.

19. The seal according to claim 1, wherein the metal comprises bronze, a sinter metal, or a combination of bronze and sinter metal.

20. The seal of claim 1, wherein the arcuate portion is configured to flex to accommodate radial displacement of the sleeve.

21. A seal to seal a gap between a rotatable component and a non-rotatable component, the rotatable component having an outer diameter, the seal comprising:
    a fastening section adapted to be fixedly mounted in relation to the non-rotatable component,
    a sleeve executed in metal and adapted to be mounted around the rotatable component such that the rotatable component is rotatable relative to the sleeve, the sleeve having an inner diameter defining a sealing surface, wherein the sealing surface forms a dynamic seal with the outer diameter of the rotatable component when the rotatable component is rotated, the sleeve further having at least one axial end face comprising hydrodynamic means, and
    a resilient section disposed between the sleeve and the fastening section and including an arcuate portion,
    wherein a ratio of the inner diameter of the sleeve in an unmounted state to the outer diameter of the rotatable component is greater than 1 such that a clearance fit is defined between the inner diameter of the sleeve and the outer diameter of the rotatable component, at least when the rotatable component is stationary.

22. The seal according to claim 21, wherein the hydrodynamic means comprises variations in a surface geometry of the axial end face.

23. The seal of claim 22, wherein the variations in the surface geometry of the at least one axial end face of the sleeve comprise one or more ramps defined in the at least one axial end face.

24. A seal to seal a gap between a rotatable component and a non-rotatable component, the rotatable component having an outer diameter, the seal comprising:
- a fastening section adapted to be fixedly mounted in relation to the non-rotatable component,
- a sleeve executed in metal and adapted to be mounted around the rotatable component such that the rotatable component is rotatable relative to the sleeve, the sleeve having an inner diameter defining a sealing surface, wherein the sealing surface forms a dynamic seal with the outer diameter of the rotatable component when the rotatable component is rotated,
- a resilient section disposed between the sleeve and the fastening section and including an arcuate portion, the resilient section contacting the sleeve along substantially an entirety of an axial length of the sleeve, and
- wherein a ratio of the inner diameter of the sleeve in an unmounted state to the outer diameter of the rotatable component is greater than 1 such that a clearance fit is defined between the inner diameter of the sleeve and the outer diameter of the rotatable component, at least when the rotatable component is stationary.

* * * * *